US007163351B1

(12) United States Patent
Shaver

(10) Patent No.: US 7,163,351 B1
(45) Date of Patent: Jan. 16, 2007

(54) TIRE CLEANING APPARATUS

(76) Inventor: Donald S. Shaver, 3554 N. Torrey Pines Dr., Las Vegas, NV (US) 89108

( * ) Notice: Subject to any disclaimer, the term of this patent is extended or adjusted under 35 U.S.C. 154(b) by 0 days.

(21) Appl. No.: 11/312,566

(22) Filed: Dec. 21, 2005

(51) Int. Cl.
E01C 5/16 (2006.01)

(52) U.S. Cl. .......................... 404/15; 404/35; 15/53.1; 15/94

(58) Field of Classification Search ............... 15/53.1, 15/53.3, 94; 404/15, 35, 36; 238/14
See application file for complete search history.

(56) References Cited

U.S. PATENT DOCUMENTS

| 1,389,400 | A | * | 8/1921 | Tufts | ........................... | 238/14 |
| 1,574,729 | A | * | 2/1926 | Foster | ........................ | 238/14 |
| 2,084,118 | A | | 6/1937 | Zabriskie | | |
| 2,402,090 | A | * | 6/1946 | Ruppel | ........................ | 404/36 |
| 3,096,939 | A | * | 7/1963 | Kalfen | ......................... | 238/14 |
| 3,685,243 | A | | 8/1972 | Wyss | | |
| 3,790,135 | A | | 2/1974 | Christianson | | |
| 3,997,110 | A | * | 12/1976 | Aumont | ...................... | 238/14 |
| 4,163,545 | A | | 8/1979 | Ostermiller | | |
| 4,211,366 | A | * | 7/1980 | Czarnota | ..................... | 238/14 |
| 4,655,435 | A | | 4/1987 | Joseph | | |
| 4,917,125 | A | | 4/1990 | Midkiff | | |
| 5,024,550 | A | | 6/1991 | Mainville | | |
| 5,203,544 | A | | 4/1993 | Webb | | |
| 5,261,433 | A | | 11/1993 | Smith | | |
| 5,383,742 | A | * | 1/1995 | Grace | .......................... | 404/15 |
| 5,595,370 | A | | 1/1997 | Heck | | |
| D402,044 | S | | 12/1998 | DeBlock | | |
| 6,358,330 | B1 | | 3/2002 | McGraw | | |
| 2004/0141809 | A1 | | 7/2004 | Wagstaff | | |

FOREIGN PATENT DOCUMENTS

EP 0041087 12/1981

* cited by examiner

Primary Examiner—Gary S. Hartmann
(74) Attorney, Agent, or Firm—Richard C. Litman

(57) ABSTRACT

The tire cleaning apparatus provides a vibration-inducing surface for a vehicle passing over the tire cleaning apparatus in order to remove dirt and debris from the tires of the vehicle. The tire cleaning apparatus includes at least one tire-cleaning frame, which is formed from a plurality of upper C-shaped beams, which are secured to a plurality of lower C-shaped beams in a rectilinear grid-shaped pattern. Sidewalls of the upper C-shaped beams, which project upwardly, form the vibration-inducing surface, and channels formed in the upper C-shaped beams allow for the collection of dirt and debris, and also provide for the drainage of water. Similar sidewalls of the lower C-shaped beams engage the ground for secure positioning of the tire-cleaning frame.

10 Claims, 4 Drawing Sheets

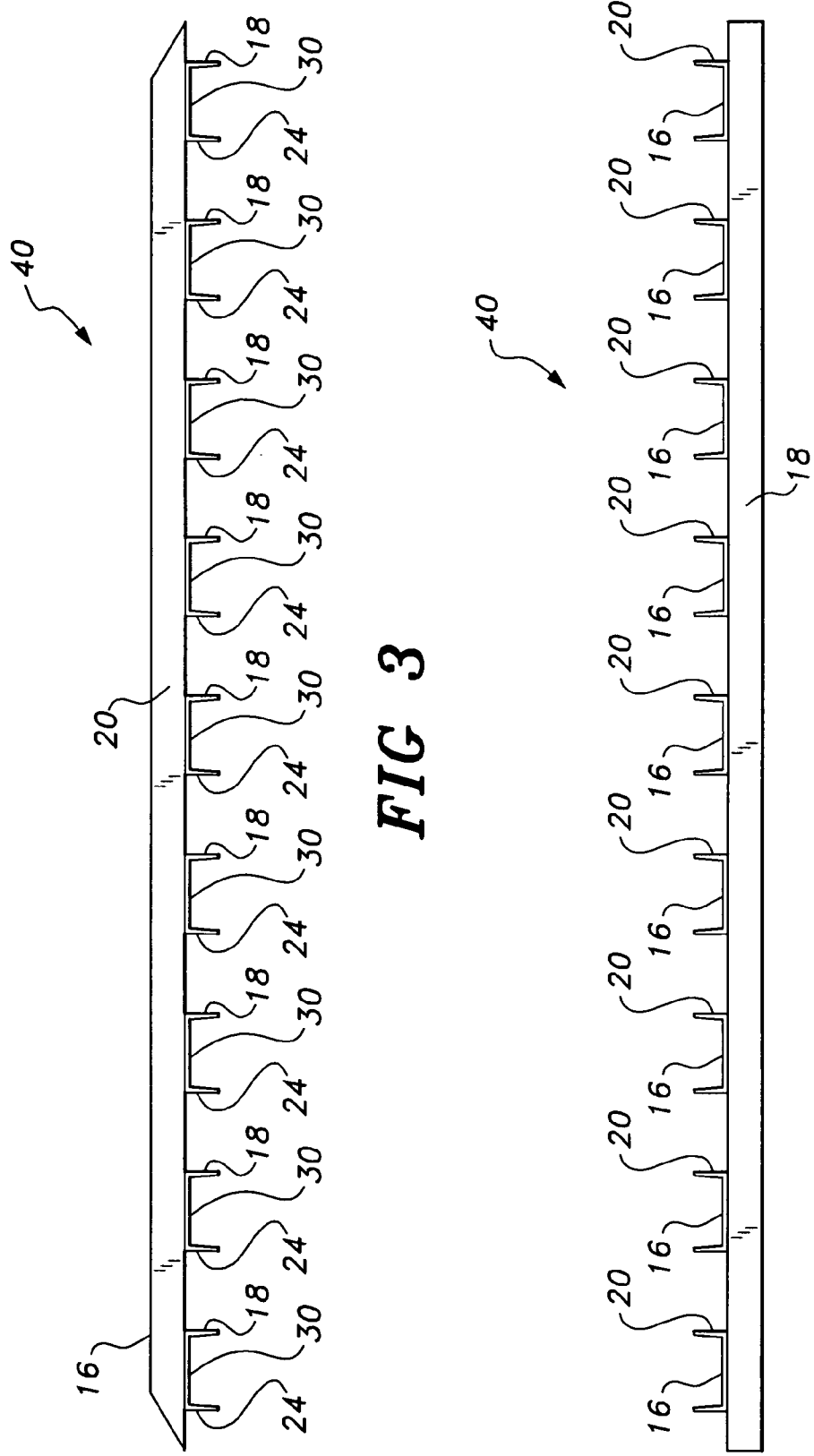

TIRE CLEANING APPARATUS

BACKGROUND OF THE INVENTION

1. Field of the Invention

The present invention relates to a tire cleaning apparatus, which provides a vibration-inducing surface for a vehicle passing over the tire cleaning apparatus in order to remove dirt and debris from the tires of the vehicle.

2. Description of the Related Art

Vehicles, particularly trucks, involved in construction and other heavy work activities tend to accumulate mud, dirt and other debris on their tires. The dirt and debris collects in the tire treads, thus reducing the effective depth of the tire treads, which may create a hazardous condition. Additionally, the added weight of the dirt and debris reduces the efficiency of the vehicle and, further, the collection of dirt and debris on the tires may reduce their flexibility, which could also create a hazardous condition. In order to operate a vehicle in a safe and efficient manner, it is necessary to remove collected dirt and debris from the tires.

Various tire cleaning methods have been utilized for this purpose. Such methods either use a pressurized washing system, or provide a vibration-inducing surface for knocking off the dirt and debris as the tires are driven over the surface. Such vibration-inducing surfaces are typically created from a grate or a series of rods or beams, over which the vehicle drives, or are formed as conventional shaker plates or rumble strips. These systems, however, do not provide for the effective removal of the dirt and debris therefrom and, thus, can become easily clogged. Additionally, such systems do not provide for the drainage of water.

Since most of these vibration-inducing systems are used in construction sites and similar environments without vegetation, wastewater and rainwater create mud, which would tend to collect beneath and around a grate or a series of beams. Further, some districts have rules and laws regarding proper wastewater drainage. Thus, it would be preferable to provide a tire cleaning system that satisfies legal zoning requirements for drainage. Ideally, a tire cleaning system would not only satisfy local drainage requirements, but would, by virtue of the drainage function, prevent the tire cleaning apparatus from becoming clogged and encrusted with mud and other debris from the tires.

Further, typical tire cleaning devices have a set width, generally the width of a typical truck. However, in high traffic volumes areas, such as a construction site, traffic can easily become clogged if each truck must pass, one at a time, over the tire cleaning apparatus. It would be preferable to provide a system having adjustable width, allowing multiple trucks to pass over the system, dependent upon the needs of the users. Thus, a tire cleaning apparatus solving the aforementioned problems is desired.

SUMMARY OF THE INVENTION

The tire cleaning apparatus provides a vibration-inducing surface for a vehicle passing over the tire cleaning apparatus in order to remove dirt and debris from the tires of the vehicle. The tire cleaning apparatus includes at least one tire-cleaning frame, which is formed from a plurality of upper C-shaped beams, which are secured to a plurality of lower C-shaped beams in a rectilinear grid-shaped pattern. Sidewalls of the upper C-shaped beams, which project upwardly, form the vibration-inducing surface, and channels formed in the upper C-shaped beams allow for the collection of dirt and debris, and also provide for the drainage of water.

As the vehicle drives over the tire-cleaning frame, the sidewalls cause vibration and deformation in the tires, knocking off bits of debris and dirt, which were stuck to the tires. Similar sidewalls of the lower C-shaped beams engage the ground, for secure positioning of the tire-cleaning frame.

Multiple tire cleaning frames may be utilized, depending on the needs and desires of the user. Tire cleaning frames may be arranged adjacent one another on the ground, or they may releasably interlock, through releasable engagement of overhanging portions of the upper C-shaped beams.

These and other features of the present invention will become readily apparent upon further review of the following specification and drawings.

BRIEF DESCRIPTION OF THE DRAWINGS

FIG. 3 is a longitudinal side view of the tire-cleaning frame of the tire cleaning apparatus of the present invention.

FIG. 4 is a lateral side view of the tire-cleaning frame of the tire cleaning apparatus of the present invention

Similar reference characters denote corresponding features consistently throughout the attached drawings.

DETAILED DESCRIPTION OF THE PREFERRED EMBODIMENTS

Figure 1:
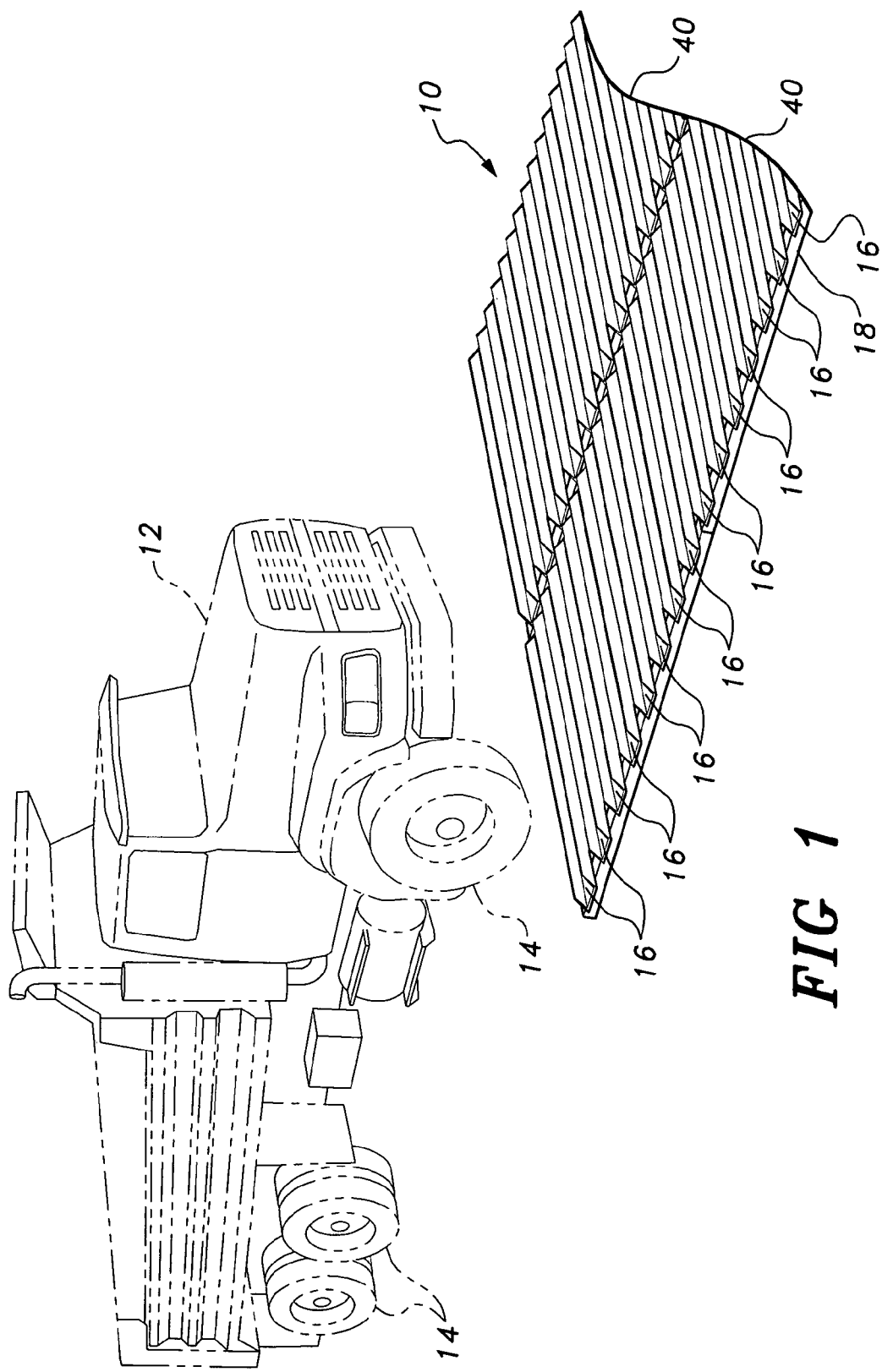
FIG. 1 is an environmental, perspective view of a tire cleaning apparatus according to the present invention.

As shown in FIG. 1, a tire cleaning apparatus 10 is provided for removing dirt and other debris from the tires 14 of vehicle 12. Vehicle 12 is shown here as a dump truck, however, it should be understood that tire cleaning apparatus 10 may be used for the cleaning of tires of any suitable vehicle. The tire cleaning apparatus 10 includes at least one support frame 40, which is formed, as will be described in greater detail below, from a plurality of upper C-shaped beams 16 secured to a plurality of lower C-shaped beams 18. The tire cleaning apparatus 10 forms a vibration-inducing surface, serving to remove dirt and other debris from tires 14 as truck 12 drives over the apparatus 10.

FIG. 1 illustrates a pair of tire cleaning frames 40 positioned adjacent one another, forming the tire cleaning apparatus 10. Depending on the width desired by the user, and depending upon the environment in which the tire cleaning apparatus 10 is utilized, as many individual tire cleaning frames 40 as necessary may be positioned adjacent and contiguous to one another to form the tire cleaning apparatus 10 having a selectable desired width. As will be described in further detail below (with regard to FIG. 5 in particular), the tire cleaning frames 40 may alternatively be joined together in a releasable, locking manner. The dimensions of the tire cleaning frames 40 are dependent upon the needs and desires of the user. However, in the preferred embodiment, each tire-cleaning frame is approximately 10 feet long and approximately 8 feet wide.

Figure 2:
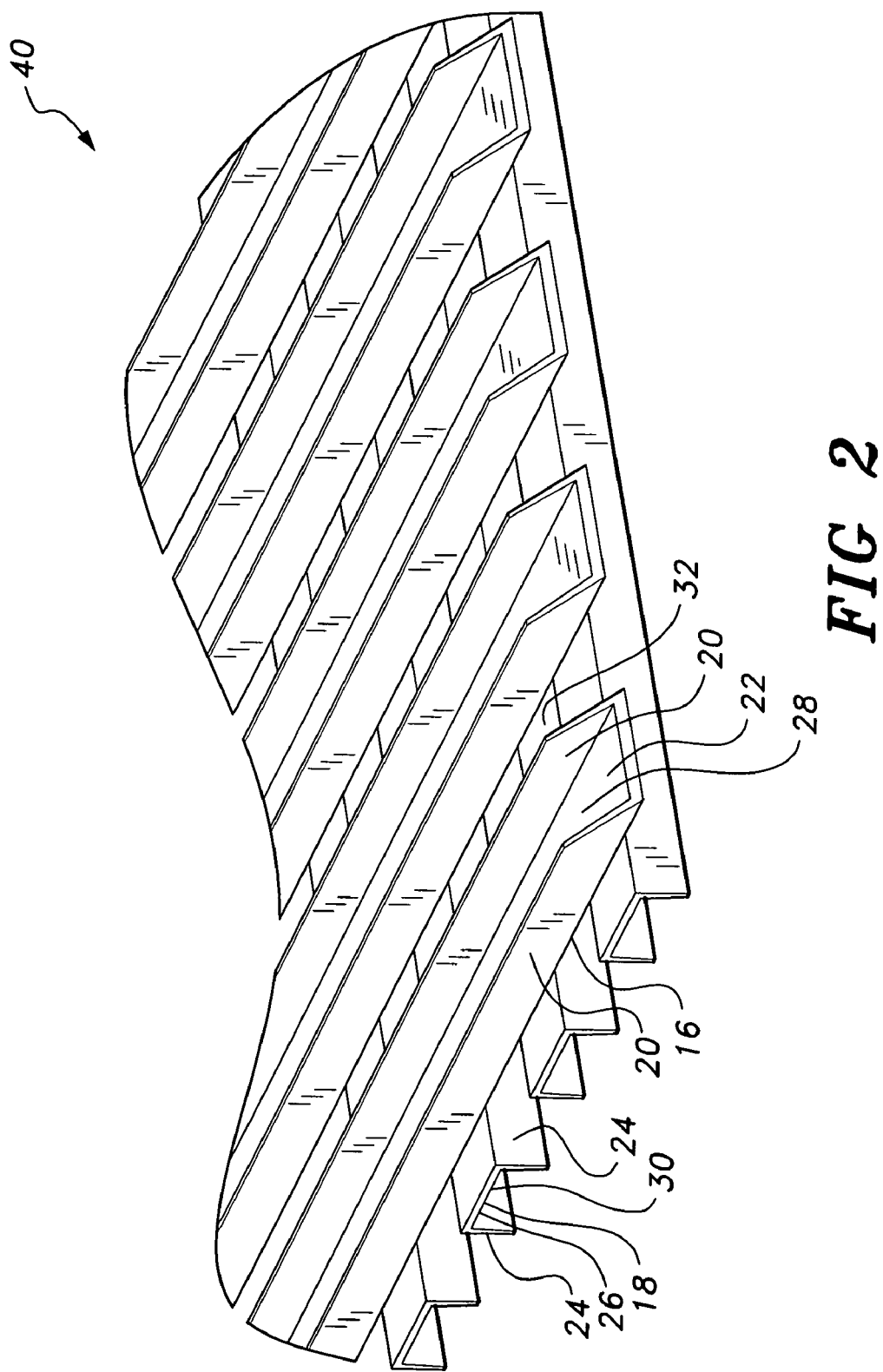
FIG. 2 is a partial perspective view of a tire-cleaning frame of the tire cleaning apparatus according to the present invention.

As better shown in FIG. 2, each tire-cleaning frame 40 includes a plurality of upper C-shaped beams 16, which are secured to a plurality of lower C-shaped beams 18 through welding or other similar methods of joining metal. Upper C-shaped beams 16 and lower C-shaped beams 18 are formed of iron or other similar strong and sturdy metals, which are resistant to excessive deformation under the stress and strain of passing vehicles 12.

Each of the upper C-shaped beams 16 includes a pair of sidewalls 20 and a base wall 22, which define an internal channel 28. Though the size and configuration of the C-shaped beams 16 are dependent upon the needs and desires of the user, in the preferred embodiment, base wall 22 is substantially planar and sidewalls 20 project upwardly and substantially orthogonally therefrom. Further, in the preferred embodiment, side walls 20 are positioned approximately 8 inches apart, thus defining an approximately 8 inch wide channel 28 therebetween.

Similarly, each of the lower C-shaped beams 18 includes a pair of sidewalls 24 and a base wall 26, which define an internal channel 30. Though the size and configuration of the lower C-shaped beams 18 are dependent upon the needs and desires of the user, in the preferred embodiment, base wall 26 is substantially planar and sidewalls 24 project downwardly and substantially orthogonally therefrom. Further, in the preferred embodiment, side walls 24 are positioned approximately 8 inches apart, thus defining an approximately 8 inch wide channel 30 therebetween.

As shown in FIGS. 2, 3 and 4, each of the upper C-shaped beams 16 extends along a first axis, and each of the lower C-shaped beams 18 extends along a second axis, which is substantially orthogonal to the first axis. The lower surfaces of base plates 22 are joined, through welding or the like, to the upper surfaces of base plates 26, as best shown in FIG. 2, with the upper C-shaped beams 16 being arranged equidistantly from one another and, similarly, the lower C-shaped beams 18 being arranged equidistantly from one another. Thus, upper C-shaped beams 16 and lower C-shaped beams 18 are arranged in a substantially rectilinear grid-like pattern, forming open regions 32, as shown in FIG. 2.

In use, upper C-shaped beams 16 are positioned above lower C-shaped beams 18, as illustrated in the drawings, such that lower C-shaped beams 18 may engage the ground. Each frame 40 is positioned on a ground surface, which may be covered with dirt, gravel or any other material typically found around a construction site or similar environments. Sidewalls 24 penetrate this ground surface and the ground material, such as rock, gravel or dirt, is received within lower channel 30, thus providing a secure and stable mounting position for the frame 40. Frame 40 may later be disengaged from the ground and transported to the next site for subsequent use.

When positioned in the ground, sidewalls 20 project upwardly, as best shown in the side view of FIG. 4. When a vehicle, such as truck 12 of FIG. 1, drives over the series of upwardly projecting side walls 20, the tires 14 are subjected to vibration and deformation, which will remove dirt and other debris stuck to the tire surface, and embedded in the tire treads. The dirt and debris is collected within channels 28 and falls through open regions 32. The dirt and debris in channels 28 may be easily removed after use, thus keeping channels 28 clean and free of debris.

Further, channels 28 and open regions 32 provide paths for water drainage, which is necessary to keep the surrounding area free from flooding and hazardous mud puddles. Further, the proper drainage of water through channels 28 and open regions 32 prevents dirt and debris from clogging channels 32 and the open regions 32, and further allows for ease in cleaning the frames 40.

Figure 5:
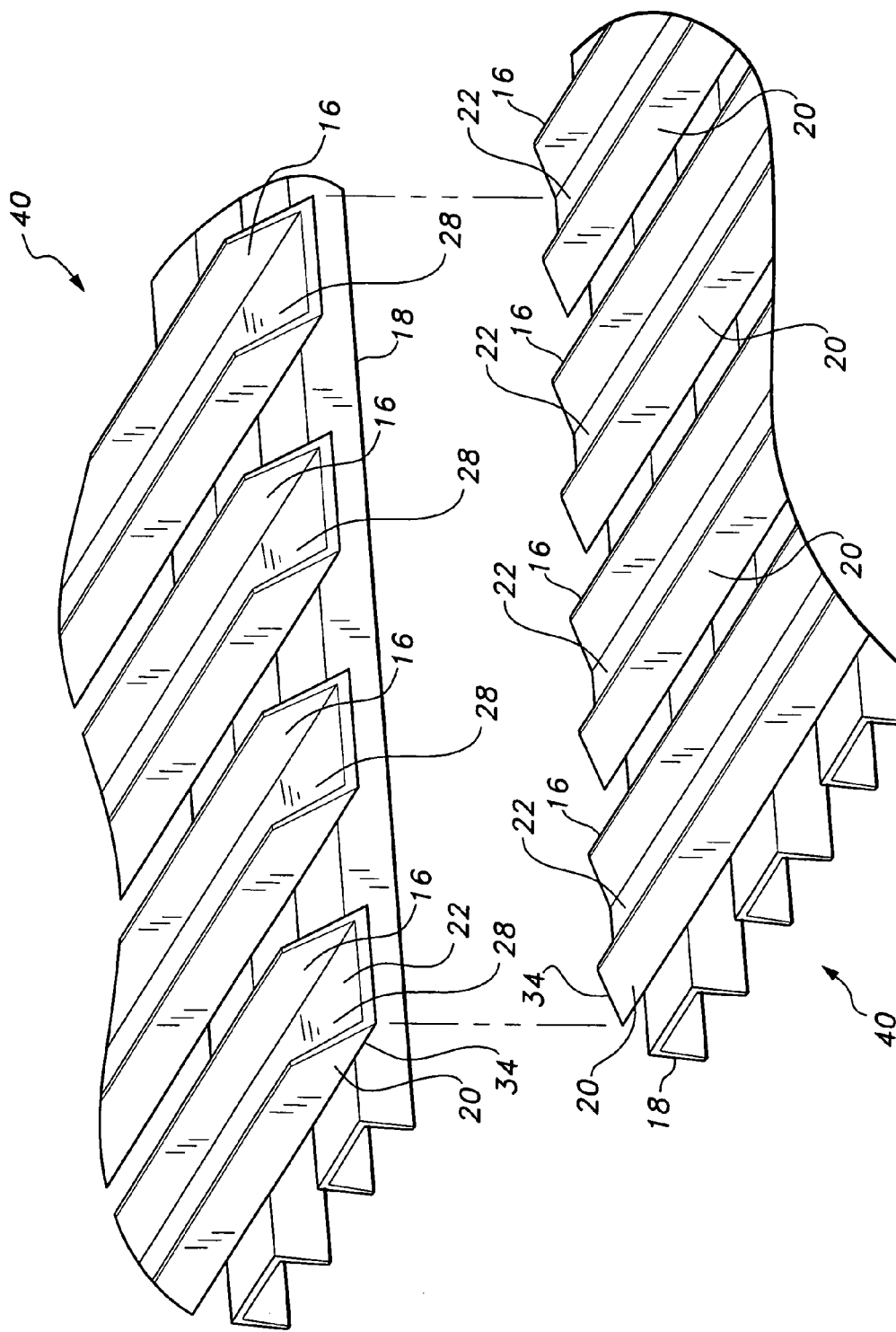
FIG. 5 is a perspective view showing the releasable connection of a pair of tire cleaning frames of the tire cleaning apparatus of the present invention.

In FIG. 1, a pair of tire cleaning frames 40 are positioned adjacent and contiguous one another, to form a "double wide" tire cleaning apparatus 10. Alternatively, as shown in FIG. 5, adjacent tire cleaning frames 40 may be releasably joined to one another. As shown, each upper C-shaped beam 16 extends beyond the end lower C-shaped beam 18, to form an overhanging region 34. In the preferred embodiment, each upper C-shaped beam overhangs the end lower C-shaped beam by approximately 4 inches.

The overhanging regions 34 of one frame 40 are received within the corresponding channels 28 of the adjacent frame 40, with the adjacent sets of overhanging regions 34 being releasably locked together through frictional engagement. In use, the weight of the vehicles passing over the tire cleaning apparatus 10 could be used to force the upper overhanging regions 34 into the lower overhanging regions 34. Since the frames 40 are interconnected through frictional engagement alone, they may be easily released and disassembled for cleaning and transport.

As further shown in the Figures, the ends of the sidewalls 20 in each overhanging region may have angled contours. This angling of the wall edges decreases the chance of tire damage caused by a tire passing over a sharp corner on one of the sidewalls 20. Though shown as an angled edge, it should be understood that sidewalls 20 may be contoured in any suitable manner, dependent upon the needs and desires of the user.

It is to be understood that the present invention is not limited to the embodiments described above, but encompasses any and all embodiments within the scope of the following claims.

I claim:

1. A tire cleaning apparatus, comprising at least one tire cleaning frame having:
a plurality of upper C-shaped beams, each of the plurality of upper C-shaped beams having a pair of sidewalls and a base wall defining an upper channel therein, each of the upper C-shaped beams extending along a first axis, the upper C-shaped beams being equidistantly spaced apart from adjacent ones of the plurality of upper C-shaped beams, each of said plurality of upper C-shaped beams having first and second ends opposed along said first axis, said sidewalls of each of said plurality of upper C-shaped beams being tapered at said first and second ends;
a plurality of lower C-shaped beams, each of the lower C-shaped beams having a pair of sidewalls and a base wall defining a lower channel therein, each of the lower C-shaped beams extending along a second axis substantially orthogonal to the first axis, the plurality of lower C-shaped beams being equidistantly spaced apart from adjacent ones of the plurality of lower C-shaped beams, the base walls of the plurality of upper C-shaped beams being secured to the base walls of the plurality of lower C-shaped beams, and the plurality of lower C-shaped beams being adapted for engaging a support surface, the sidewalls of the plurality of upper C-shaped beams forming a vibration-inducing surface for a vehicle traveling over the at least one tire cleaning frame for removing debris from the tires of the vehicle.

2. The tire cleaning apparatus as recited in claim 1, wherein said plurality of lower C-shaped beams include first and second lower C-shaped beams, said first and second lower C-shaped beams being positioned opposite one another in the longitudinal direction, whereby said first ends of said plurality of upper C-shaped beams extend beyond said first lower C-shaped beam, and said second ends of said plurality of upper C-shaped beams extend beyond said second lower C-shaped beam.

3. The tire cleaning apparatus as recited in claim 2, wherein adjacent ones of said tire cleaning frames releasably engage one another, said first ends of said upper C-shaped beams of a first tire cleaning frame being releasably received in said upper channels of said second ends of said upper C-shaped beams of a second tire cleaning frame.

4. The tire cleaning apparatus as recited in claim 1, wherein said sidewalls of each of said plurality of upper C-shaped beams are positioned substantially orthogonal to said respective base wall.

5. The tire cleaning apparatus as recited in claim 4, wherein said sidewalls of each of said plurality of lower C-shaped beams are positioned substantially orthogonal to said respective base wall.

6. The tire cleaning apparatus as recited in claim 1, wherein said upper and lower C-shaped beams define open regions therebetween in a substantially rectilinear grid-shaped pattern.

7. The tire cleaning apparatus as recited in claim 6, wherein said open regions are adapted for fluid drainage.

8. The tire cleaning apparatus as recited in claim 7, wherein said open regions are further adapted for collection of said debris from said tires.

9. The tire cleaning apparatus as recited in claim 1, wherein said upper channels are adapted for fluid flow and fluid drainage.

10. The tire cleaning apparatus as recited in claim 9, wherein said upper channels are further adapted for collection of said debris from said tires.

\* \* \* \* \*